(12) United States Patent
Hund

(10) Patent No.: US 11,381,648 B2
(45) Date of Patent: Jul. 5, 2022

(54) METHOD AND APPARATUS FOR DATA INTERCHANGE

(71) Applicant: SIEMENS AKTIENGESELLSCHAFT, Munich (DE)

(72) Inventor: Johannes Hund, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/085,574

(22) PCT Filed: Feb. 8, 2017

(86) PCT No.: PCT/EP2017/052696
§ 371 (c)(1),
(2) Date: Sep. 15, 2018

(87) PCT Pub. No.: WO2017/157584
PCT Pub. Date: Sep. 21, 2017

(65) Prior Publication Data
US 2019/0124158 A1    Apr. 25, 2019

(30) Foreign Application Priority Data

Mar. 15, 2016    (DE) .......................... 102016204195.9

(51) Int. Cl.
*H04L 67/142* (2022.01)
*H04L 67/02* (2022.01)
(Continued)

(52) U.S. Cl.
CPC ............ *H04L 67/142* (2013.01); *H04L 67/02* (2013.01); *H04L 67/322* (2013.01); *H04L 69/22* (2013.01); *H04L 69/329* (2013.01)

(58) Field of Classification Search
CPC ..... H04L 67/142; H04L 69/329; H04L 69/22; H04L 67/322; H04L 67/02
See application file for complete search history.

(56) References Cited

U.S. PATENT DOCUMENTS 6,965,604 B1 * 11/2005 Sato .................... H04L 12/2898
370/338
7,401,118 B1 * 7/2008 Yokota ................ H04L 47/2458
709/203
(Continued)

FOREIGN PATENT DOCUMENTS

CA          2331046 A1    7/2002
CN        101478755 A     7/2009
(Continued)

OTHER PUBLICATIONS

German Office Action for German Application No. 102016204195.9, dated Oct. 27, 2016.
(Continued)

*Primary Examiner* — Jimmy H Tran
(74) *Attorney, Agent, or Firm* — Lempia Summerfield Katz LLC

(57) ABSTRACT

The method according to the invention for data exchange using a stateless transfer protocol, in particular HTTP, provides an enhancement of a message header of the message by one or more quality-of-service attributes, which are utilized by network nodes involved in the data exchange to determine the handling of each message according to the specifications of the quality-of-service attribute. In this way, a quality-of-service can be implemented on a transfer and/or application layer. The implementation of a quality-of-service on an application layer guarantees an annotation of each individual message, in terms of its characteristics and expectations, during a data transfer of messages associated with a plurality of different applications. In this way, the end-points (Continued)

can control the data exchange in detail. The quality-of-service settings achieved by the quality-of-service attributes can also be passed on to deeper application layers, if required. In this way, improved quality-of-service results can be achieved in the network, in particular in load situations.

10 Claims, 2 Drawing Sheets

(51) Int. Cl.
*H04L 67/61* (2022.01)
*H04L 69/22* (2022.01)
*H04L 69/329* (2022.01)

(56) References Cited

U.S. PATENT DOCUMENTS

| | | | | |
|---|---|---|---|---|
| 2002/0120760 A1* | 8/2002 | Kimchi | ................... | H04L 69/26 709/227 |
| 2002/0143981 A1* | 10/2002 | DeLima | ............... | H04L 41/147 709/233 |
| 2006/0059253 A1* | 3/2006 | Goodman | .............. | G06Q 10/10 709/223 |
| 2007/0005768 A1* | 1/2007 | Won | ................... | H04L 65/4084 709/225 |
| 2007/0156919 A1* | 7/2007 | Potti | ....................... | H04L 45/00 709/238 |
| 2007/0230342 A1* | 10/2007 | Skog | ....................... | H04L 67/02 370/232 |
| 2008/0025230 A1* | 1/2008 | Patel | ................... | H04L 41/5022 370/252 |
| 2008/0034052 A1* | 2/2008 | Bess | ....................... | H04L 29/06 709/207 |
| 2008/0056273 A1* | 3/2008 | Pelletier | .................. | H04L 69/22 370/395.21 |
| 2008/0222248 A1* | 9/2008 | Eberlein | ................. | H04L 67/02 709/204 |
| 2010/0094945 A1* | 4/2010 | Chan | ................... | H04L 67/2842 709/217 |
| 2010/0202287 A1* | 8/2010 | Diaz | ....................... | H04L 47/10 370/230 |
| 2010/0250696 A1* | 9/2010 | Iwasaki | ................... | H04L 47/19 709/207 |
| 2010/0251262 A1 | 9/2010 | Rokicki | | |
| 2011/0019556 A1* | 1/2011 | Hsin | ....................... | H04L 65/80 370/252 |
| 2011/0271326 A1 | 11/2011 | Liang | | |
| 2012/0033563 A1* | 2/2012 | Jazra | ................... | H04L 47/2433 370/252 |
| 2012/0054809 A1* | 3/2012 | Chowdhury | ....... | H04N 21/2223 725/93 |
| 2012/0296784 A1* | 11/2012 | Connor | ............... | H04L 12/1407 705/34 |
| 2013/0059527 A1* | 3/2013 | Hasesaka | ................ | H04L 12/66 455/7 |
| 2016/0182601 A1* | 6/2016 | Zombek | .................. | H04L 67/40 709/203 |
| 2018/0176157 A1* | 6/2018 | Kret | ....................... | H04L 67/02 |
| 2018/0295190 A1* | 10/2018 | Lu | ......................... | H04L 67/146 |
| 2019/0020706 A1* | 1/2019 | Hund | ................... | H04L 65/608 |

FOREIGN PATENT DOCUMENTS

CN 101854351 A 10/2010
WO WO02056566 A1 7/2002

OTHER PUBLICATIONS

PCT International Search Report dated Mar. 24, 2017 and corresponding to PCT International Application No. PCT/EP2017/052696 filed Feb. 8, 2017.
German Office Action for German Application No. 10 2016 204195.9 dated Jun. 24, 2020.
Chinese Office Action for Chinese Application No. 201780017437.8 dated Jul. 16, 2020.

* cited by examiner

METHOD AND APPARATUS FOR DATA INTERCHANGE

This application is the National Stage of International Application No. PCT/EP2017/052696, filed Feb. 8, 2017, which claims the benefit of German Patent Application No. DE 10 2016 204 195.9, filed Mar. 15, 2016. The entire contents of these documents are hereby incorporated herein by reference.

BACKGROUND

The present embodiments relate to a method and an apparatus for data interchange.

Transmission protocols that provide stateless transmission of data via a computer network are known in the prior art. One transmission protocol predominantly used today is known as the "hypertext transfer protocol" or HTTP. HTTP is used today primarily for transmitting hypertext documents in the world wide web (WWW), but increasingly also for providing web services for direct machine-to-machine interaction.

An HTTP communication between two communication units (e.g., a client and a server) is effected by an interchange of messages that usually include a request and a response. A request, which is usually sent from a client to a server, is followed by a response as a reaction to the request.

To achieve a machine-to-machine interaction using HTTP, a scheme for distributed web services, also known as "representational state transfer" or REST in specialist circles, has proved itself. Like the transmission protocol HTTP, the REST scheme is also stateless (e.g., no storage of state information by the communication partners involved is effected between two messages). This statelessness provides scaleability of a web service. In the course of a load distribution, requests arriving on a server may readily be distributed over multiple servers. Web services consistent with the REST scheme are also referred to as RESTful. To provide web services, request schemes that are already defined in the HTTP transmission protocol (eg., the known request schemes GET, POST, PUT/PATCH or DELETE) are used.

While use of HTTP for transmitting hypertext documents does not require any particular presets for the quality of the message interchange, implementations of web services using message-oriented middleware applications require a defined quality of service (QoS). This quality of service includes, for example, specified response times or a required throughput of messages. These kinds of demands on quality of service are distinguished in this case based on applications that are superordinate to or use the message-oriented middleware application.

Currently known measures for providing a pledged quality of service include parameterization of a data packet traffic with reservation, optimization and possibly limitation of data packet rates. These measures are all effected on layer 3 of the known open systems interconnection (OSI) model (e.g., on the network layer that relates to the switching at data packet level).

Measures for providing a quality of service on the network layer are not suitable for message-oriented middleware applications based on HTTP, however, since the measures only control forwarding of data packets on layer 3 of the OSI model, while the message-oriented middleware applications are supposed to regulate superordinate message interchange on a transmission and/or application layer. At the superordinate level of the transmission and/or application layer, data-packet-oriented quality of service attributes are no longer accessible from the network layer and continue not to be invariable anyway (e.g., in the case of switching over multiple network segment boundaries), since data-packet-oriented attributes may be changed at any time during the forwarding of data packets in individual network nodes. Measures for providing a quality of service for a data interchange between a sender and a receiver on a transmission and/or application layer thus cannot be accomplished using known approaches for providing a quality of service on the network layer.

SUMMARY AND DESCRIPTION

The scope of the present invention is defined solely by the appended claims and is not affected to any degree by the statements within this summary.

The present embodiments may obviate one or more of the drawbacks or limitations in the related art. For example, ways that admit setting of a quality of service for a stateless transmission protocol on a transmission and/or application layer are provided.

The method for data interchange according to the present embodiments has provision for setup of a data connection via at least one network node to be followed by a data interchange by a plurality of messages according to a stateless transmission protocol. A message contains not only the data that is actually to be interchanged (e.g., user data or "payload"), but also a message header. The message header includes one or more header fields that include, inter alia, a characterization of a type and/or content of the message.

According to the present embodiments, there is provision for the message header to be extended by one or more quality of service attributes that are used by at least one network node involved in the data interchange to determine a handling of a respective message (e.g., in comparison with other messages).

A handling of a network node involved in the data interchange between the respective receiver and the respective sender (and possibly multiple forwarding servers) involves the message header of the message being evaluated. The provision of the quality of service attributes in this area according to the present embodiments has the advantage that evaluation of the user data of the message is not required. Considerations to perform a deep inspection (e.g., analysis of the entire content in the payload of a message) instead would require considerable additional effort in comparison with the measure according to the present embodiments.

The quality of service attributes may be used by the network nodes involved in the data interchange (e.g., client, server, and forwarding network nodes ("intermediaries") to determine a handling of a respective message (e.g., also to determine a handling of a respective message in comparison with other messages, such as for the purposes of prioritization).

A "handling" of the messages in this case may take the following manifestations, depending on the purpose of use: putting the messages into a queuing process or queuing (e.g., the order in which outgoing messages are sent to the receiver); buffering (e.g., the order in which incoming messages are processed; and/or a forwarding rule or routing (e.g., to what place and whether messages are forwarded).

The present embodiments also include a computer program product having means for performing the method and via a network node for performing the method.

According to one configuration of the present embodiments, a quality of service attribute includes: a validity period for the message for determining a transmission time after which the message is irrelevant; a priority value for prioritizing the message on a transmission and/or application layer; and/or an association datum for associating the message with an application or a group of applications.

For example, the association of the message with an application or to a group of applications is found to be advantageous, since, when an HTTP channel is used for different applications, different quality of service presets or constraints (e.g., regarding response times, throughput, etc.) that are very application specific may be prescribed. It is also possible for applications to have different importances for the overall system among one another. The quality of service settings brought about by the quality of service attributes may also be forwarded to lower application layers when required. For example, in the case of load situations in the network, it is thus possible for better quality of service results to be obtained.

BRIEF DESCRIPTION OF THE DRAWINGS

FIG. 1 shows a schematic depiction of a data interchange via multiple network nodes between a client and one or more servers; and FIG. 2 is a flowchart of one embodiment of a method for data interchange on a transmission and/or application layer using a stateless transmission protocol.

DETAILED DESCRIPTION

Figure 1:
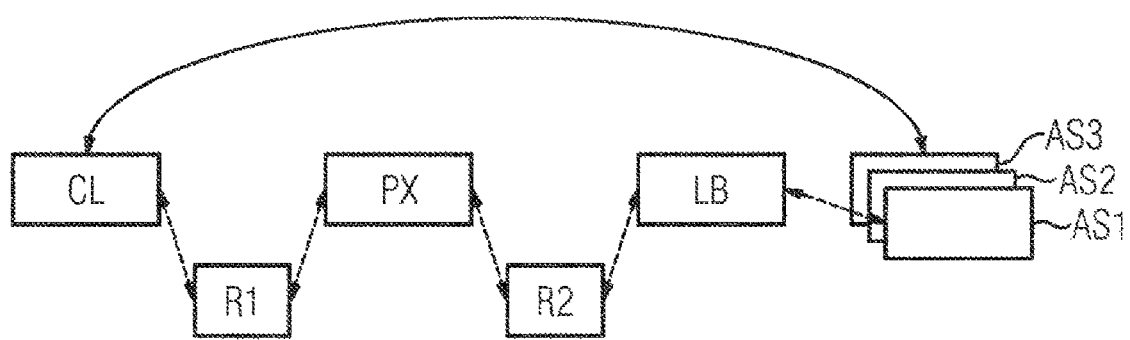
FIG. 1 is a diagram of an exemplary diagram for data interchange according to the invention.

FIG. 1 shows a schematic depiction of a data interchange between a client CL and a plurality of servers AS1, AS2, AS3 via multiple network nodes R1, PX, R2, LB. Between the communication partners (e.g., the client CL and one of the servers AS1, AS2, AS3) that act as sender and/or receiver on a case by case basis and temporarily, there are multiple network nodes R1, PX, R2, LB (e.g., a first router R1, a proxy PX, a second router R2 and a load balancer LB) involved in the data interchange between the client CL and one of the servers AS1, AS2, AS3.

Figure 2:
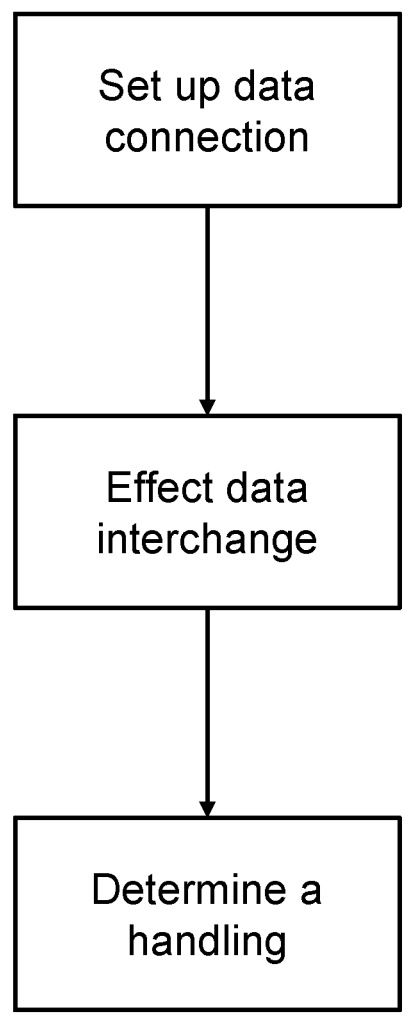
FIG. 2 is a diagram of an exemplary procedure for data interchange according to the invention.

The text below describes and FIG. 2 shows one embodiment of a method for data interchange on a transmission and/or application layer using a stateless transmission protocol (e.g., HTTP). In the method, after setup of a data connection that is persistent for a definable period (e.g., using the packet switching transport protocol transmission control protocol (TCP), a data interchange by one or more messages is effected via at least one network node R1, PX, R2, LB.

In contrast to a packet-oriented data transmission, depicted in the drawing by dashed double-headed arrows between the individual network nodes, on the network layer, the data interchange on the transmission and/or application layer is produced merely between the client CL and one of the servers AS1, AS2, AS3. The latter data interchange on the transmission and/or application layer is depicted in the drawing by an arcuate double-headed arrow between the client CL and one of the servers AS1, AS2, AS3.

After successful setup of the data-packet-oriented data connection persistent for a definable period via the intervening "intermediaries" R1, PX, R2, LB, the further data interchange, depicted in the drawing by an arcuate double-headed arrow between the client CL and one of the servers AS1, AS2, AS3, is effected as direct end-to-end communication.

The text below considers an exemplary design of a request from a client CL to a respective server AS1, AS2, AS3 in more detail. This request may have the following structure:

GET/HTTP/1.1
Host: siemens.com
Connection: close
User-Agent: Mozilla/5.0
Accept-Encoding: gzip The first line or header field

GET/HTTP/1.1 includes an instruction for a "GET" method and specifies the protocol of the HTTP message as a HTTP message in version 1.1 according to the requests for comments (RFC) 2616 specification from the Internet Engineering Task Force (IETF) or the Internet Society.

The next line

Host: siemens.com indicates a domain name for the requested server AS1.

The line

Connection: close indicates which data connection the client prefers (e.g., a data connection or TCP data connection that is closed after completion of the response).

The line

User-Agent: Mozilla/5.0 specifies an application at the client end, (e.g., a Mozilla application in version 5.0).

The line

Accept-Encoding: gzip indicates which compressed formats the client supports (e.g., the compression format gzip).

A response by the server AS1 receiving this request that answers the request may then have the following exemplary structure:

HTTP/1.1 200 OK
Content-Length: 123456
Content-Language: de
Connection: close
Content-Type: text/html
<html> . . . </html>

The first line or header field

HTTP/1.1 200 OK reports back not only the specification as an HTTP message in version 1.1 but also successful execution of the request by the acknowledgement "200 OK".

The subsequent lines

Content-Length: 123456
Content-Language: de specify the length (e.g., 123456 bytes) and the language (e.g., German) of the content or user data portion of the message.

The line

Connection: close indicates which data connection the server AS1 prefers (e.g., a data connection or TCP data connection that is closed after completion of the response).

The line

Content-Type: text/html classifies the data in the user data portion of the message
<html> . . . </html> as text in the HTML format.

According to the present embodiments, the request and response shown above, in respective message headers, are provided with at least one quality of service attribute that allows the server AS1 and the client CL a classification concerning which message has which prerequisites regarding a corresponding quality of service. The request extended according to one configuration of the present embodiments has the following exemplary structure:

GET/HTTP/1.1
Host: siemens.com
Connection: close
User-Agent: Mozilla/5.0
Accept-Encoding: gzip
X-Priority: high
X-TTL: 20 s In this configuration of the request, two quality of service (QoS) attributes, (e.g., "X-Priority" and "X-TTL") are provided. The value of the quality of service attribute "X-Priority" prescribes to the addressed server AS1 and to the network nodes R1, PX, R2, LB involved in the data interchange a priority level for forwarding and processing the request, or are generally a level for handling this request (e.g., in comparison with other messages having lower priority). In the example above, the priority of the request is set to "high" using the instruction X-Priority: high.

The value of the quality of service attribute "X-TTL" (e.g., time to live) prescribes to the addressed server AS1 and the network nodes R1, PX, R2, LB involved in the data interchange a demand on the transmission time after the message is irrelevant, or, generally, an amount of time for handling the message. In the example above, the time to live for the request is set to 20 seconds using the instruction X-TTL: 20 s.

According to one configuration of the present embodiments, a quality of service attribute "X-EOL" (e.g., end of life) is used to indicate, rather than a time to live, an end of validity (e.g., a time from which the message is irrelevant). This measure is, for example, advantageous if it may be expected that at least one of the network nodes R1, PX, R2, LB involved in the data interchange or else the client CL is unable to perform computation of the end time. This allows the network nodes R1, PX, R2, LB involved in the data interchange to directly indicate when the message may be regarded as irrelevant, without needing to compute this from their own internal time, the sending time, and the time to live. Conversely, the sending time may be computed from a difference between the end of validity X-EOL and the time to live X-TTL.

The response by the server AS1, which is extended according to one configuration of the present embodiments, has the following exemplary structure:

HTTP/1.1 200 OK
Content-Length: 123456
Content-Language: de
X-Priority: high
X-TTL: 18 s
Connection: close
Content-Type: text/html
<html> . . . </html>

The priority of the responding message in the example above is likewise set to "high", and the time to live is set to 18 seconds.

The method for data interchange using a stateless transmission protocol (e.g., a HTTP), according to the present embodiments, provides for a message header of the message to be extended by one or more quality of service attributes used by network nodes involved in the data interchange to determine a handling of a respective message according to presets for the quality of service attribute. This allows a quality of service to be achieved on a transmission and/or application layer.

The implementation of a quality of service on an application layer provides annotation of every single message regarding corresponding properties and expectations during a data transmission of a plurality of messages associated with different applications. This provides that the terminal points may bring about more detailed control of the data interchange. The quality of service settings brought about by the quality of service attributes may also be forwarded to lower application layers when needed. In one embodiment, in load situations in the network, it is thus possible for better quality of service results to be attained.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing decription be regarded as illustrative rather than limiting, and that it be understood that all equivalents and/or combinations of embodiments are intended to be included in this description.

The invention claimed is:

1. A method for data interchange, the method comprising:
setting up a data connection via at least one network node;
following the setting up, effecting the data interchange by at least one message according to a stateless transmission protocol, wherein the at least one message contains not only data to be interchanged but also a message header including a characterization of a type and content of the message, and wherein at least one quality of service attribute is provided in the message header; and
determining, by at least one intermediary network node involved in the data interchange, a handling of a respective message using the at least one quality of service attribute,
wherein the at least one quality of service attribute of the header comprises an association datum for associating the at least one message with an application or a group of applications.

2. The method of claim 1, wherein the stateless transmission protocol is configured according to the hypertext transfer protocol or HTTP.

3. The method of claim 2, further comprising evaluating the at least one quality of service attribute on a transmission layer, an application layer, or the transmission layer and the application layer of the at least one intermediary network node involved in the data interchange.

4. The method of claim 2, wherein the at least one quality of service attribute comprises:
a validity period for the at least one message for determining a transmission time after which the message is irrelevant;

a time at which the at least one message is irrelevant;
a priority value for prioritizing the at least one message on a transmission layer, an application layer, or the transmission layer and the application layer;
or any combination thereof.

5. The method of claim 1, further comprising evaluating the at least one quality of service attribute on a transmission layer, an application layer, or the transmission layer and the application layer of the at least one intermediary network node involved in the data interchange.

6. The method of claim 5, wherein the at least one quality of service attribute comprises:
a validity period for the at least one message for determining a transmission time after which the message is irrelevant;
a time at which the at least one message is irrelevant;
a priority value for prioritizing the at least one message on a transmission layer, an application layer, or the transmission layer and the application layer;
or any combination thereof.

7. The method of claim 1, wherein the at least one quality of service attribute comprises:
a validity period for the at least one message for determining a transmission time after which the message is irrelevant;
a time at which the at least one message is irrelevant;
a priority value for prioritizing the at least one message on a transmission layer, an application layer, or the transmission layer and the application layer;
or any combination thereof.

8. The method of claim 1, wherein determining the handling of the respective message comprises determining the handling of the respective message in comparison with other messages using the at least one quality of service attribute.

9. The method of claim 1, wherein the association datum of the at least one quality of service attribute of the header comprises a response time or throughput specific to the application or the group of applications.

10. A non-transitory computer-readable storage medium executable by a network node for data interchange, the instructions comprising:
setting up a data connection via at least one network node;
following the setting up, effecting the data interchange by at least one message according to a stateless transmission protocol, wherein the at least one message contains not only data to be interchanged but also a message header including a characterization of a type and content of the message, and wherein at least one quality of service attribute is provided in the message header; and
determining, by at least one network intermediary node involved in the data interchange, a handling of a respective message using the at least one quality of service attribute,
wherein the at least one quality of service attribute of the header comprises an association datum for associating the at least one message with an application or a group of applications.

* * * * *